US007099684B2

(12) United States Patent  
Cowsky, III et al.

(10) Patent No.: US 7,099,684 B2  
(45) Date of Patent: Aug. 29, 2006

(54) METHOD AND APPARATUS FOR PROTECTING AGAINST AN INADVERTENT KEYSTROKE

(75) Inventors: Albert F. Cowsky, III, Libertyville, IL (US); Steven R. Green, Waterloo (CA)

(73) Assignee: Motorola, Inc., Schaumburg, IL (US)

( * ) Notice: Subject to any disclaimer, the term of this patent is extended or adjusted under 35 U.S.C. 154(b) by 506 days.

(21) Appl. No.: 10/331,301

(22) Filed: Dec. 30, 2002

(65) Prior Publication Data

US 2004/0204123 A1  Oct. 14, 2004

(51) Int. Cl.  
*H04M 1/00* (2006.01)

(52) U.S. Cl. ...................... 455/550; 455/90.1

(58) Field of Classification Search ........... 455/550, 455/90, 567, 572, 575, 556  
See application file for complete search history.

(56) References Cited

U.S. PATENT DOCUMENTS

| | | | | |
|---|---|---|---|---|
| 5,760,714 | A | | 6/1998 | Zimmerman ............... 341/26 |
| 6,097,808 | A | | 8/2000 | Chang ...................... 379/355 |
| 6,453,169 | B1 | * | 9/2002 | Maloney .................. 455/575.1 |
| 2002/0146989 | A1 | * | 10/2002 | Moriki ...................... 455/90 |

FOREIGN PATENT DOCUMENTS

| | | |
|---|---|---|
| EP | 0 776 116 A3 | 5/1997 |
| EP | 0 918 427 A2 | 5/1999 |

OTHER PUBLICATIONS

Owner's Manual, Nokia Cellular Telephone Model 5120, pp. 12-15, printed 01/01 (see p. 69).  
Owner's Manual, Panasonic Digital Cellular Telephone, Model EB-GD30, pp. 12-13 and 24-25, copyright 1999 (see p. 47).  
Owner's Manual, Motorola Cellular Telephone, p. 45.

* cited by examiner

Primary Examiner—Nguyen T. Vo  
Assistant Examiner—Tu X. Nguyen  
(74) Attorney, Agent, or Firm—Lawrence J. Chapa

(57) ABSTRACT

A method 29 is disclosed of protecting against the mistaken dialing of a cellular telephone 10 by an inadvertent keystroke. A user may inadvertently place a telephone call or activate another function by accidentally pressing a key 15 on a cellular phone 10 while it is in a standby mode. If the key 15 pressed remains depressed for over a predetermined amount of time, the cellular phone 10 disregards the action and places the phone back in the standby mode. While in the locked mode, the cellular telephone 10 may receive a call, then upon termination of the call, the cellular telephone 10 will display a query to the user if it should be in locked mode or active mode.

9 Claims, 3 Drawing Sheets

METHOD AND APPARATUS FOR PROTECTING AGAINST AN INADVERTENT KEYSTROKE

TECHNICAL FIELD

The disclosure is generally related to a method for protecting against the dialing of a telephone with an inadvertent keystroke.

BACKGROUND

Cellular telephones can have several modes of operation with differing levels of functionality. In an active mode, all the keys may be used, the display screen is active, and the user may use the telephone to speak with another person. In standby mode, the display screen is inactive to save power and lengthen the life of the batteries, but the cellular telephone may easily be switched to an active mode by depressing any of the buttons. Finally, some cellular telephones include a locked mode. In this mode, none of the keys are active and the user is required to depress a predetermined sequence of keys, often including a password, to switch the cellular telephone to the active mode.

Because of the hassle of switching a cellular telephone from the locked mode to the active mode, and vice versa, many users leave their cellular telephones in the standby mode while it is not in use. Because most keys are still functional while in standby mode, a cellular telephone being carried in a purse or in a carrier on a belt may inadvertently be placed into contact with something that can depress one or more of its keys. This is problematic in that the cellular telephone is switched to its active state, increasing the drain on the batteries. Further, in some cellular telephone models, a function may be activated by the depressing of a key, such as a speed dial function. Thus, with the depressing of a single key, a long distance telephone call can be made. Obviously, this may be expensive and needlessly waste valuable minutes from a user's calling plan.

To protect against this problem, several cellular telephones offer the locked mode. In a first example, to lock and unlock the keypad, the user may press the "function" key, then press the "*" key. In a second example, to lock the keypad, when "menu" is displayed in the option area of the display, the user must press the "mail" key three times to enable the key lock. To disable the lock mode, the user must press the "mail" key twice while "Free" is displayed in the option area of the display. In a third example, to lock the keys, the user must press Menu +9, or Menu +*. Thus, it is desireable to have a way of protecting against unwanted calls without the hassle of locking and unlocking the keypad.

There is further the problem of receiving phone calls while the cellular telephone is in the locked mode. In most examples, to receive a phone call, the user simply answers the call as if the cellular telephone was in standby mode. However, upon termination of the call, the cellular telephone immediately reverts to the locked mode. After receiving a phone call, it is not unusual for a user to desire to make another phone call based on the discussion he or she just had. Since the cellular telephone is in the locked mode, the user must go through the steps to switch the phone to active mode. It would therefore be desireable to provide a cellular telephone that, upon termination of a call in the locked mode, gives the user the option of choosing the mode in which to place the phone.

Figure 1:
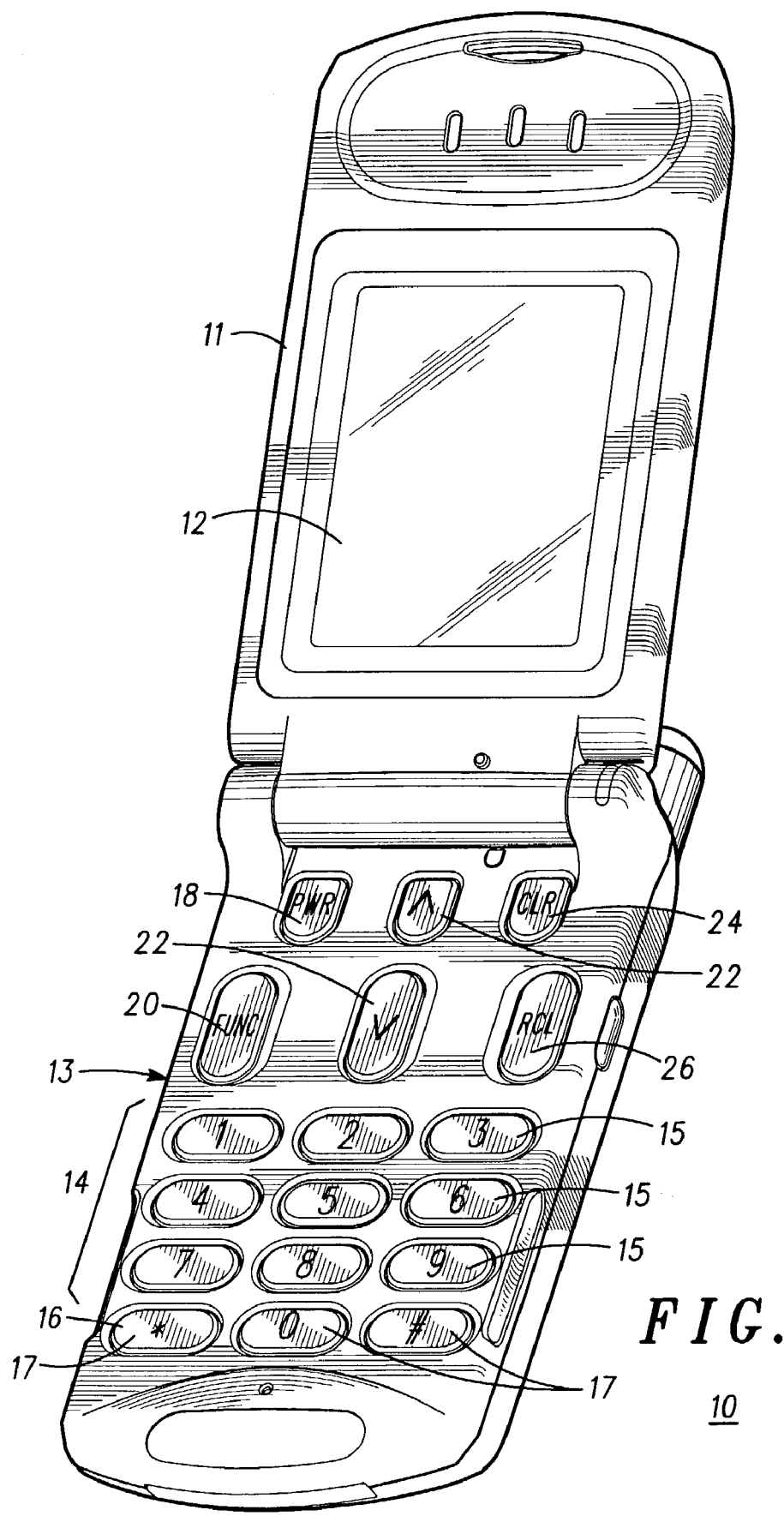
FIG. 1 is a plan view of an example of a cellular telephone.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and the equivalents falling within the spirit and scope of the invention as defined by the appended claims.

DETAILED DESCRIPTION OF THE PREFERRED EMBODIMENTS

Referring now to the drawings, and particularly to FIG. 1, an example of a cellular telephone 10 is illustrated. The teachings of this disclosure will be applied to the specific example of the cellular telephone 10, however, it will be readily seen by those skilled in the art that these teachings may be applied to telephones, cellular, land line, or otherwise, that are configured differently, and that the scope of the claims to the method and apparatus are not limited to the specific cellular telephone 10, but may be applied to any telephone. The teachings of this disclosure may further be applied to other systems in which information is entered by depressing a key such as pagers, personal computers, calculators, personal digital assistants, wireless e-mail devices, etc.

The cellular telephone 10 includes a body 11 and a central processing unit (not shown) which directs its functioning. The cellular telephone 10 further includes a graphical display 12. The graphical display 12 communicates information to the user such as the number being dialed, the telephone number from an incoming call, video games, e-mail, and other functions. Disposed on the body 11 of the telephone 10 is a keypad 13 which includes a first number set 14. The number set 14 includes individual keys 15 corresponding to for the numbers 1 through 9, as is very well known. The keys 15 are depressed by the user in a specific sequence to dial a telephone number of a person the user is attempting to contact. In this example, the keys 15 may also be used to speed dial a preprogrammed telephone number. The speed dial function allows the user to simply depress one of the keys 15 that has been pre-programmed with a telephone number he or she desires to call and to hold the key 15 down for a predetermined amount of time, for example one second. Thus, once the user has depressed the key for the required period of time, the telephone automatically dials the preprogrammed number associated with the selected key 15.

A second key set 16 contains individual keys 17, the individual keys including the "*", "0", and the "#" key. In this example, the keys 17 are not programmable to speed dial another telephone number. However, in other embodiments the keys 17 could preprogrammed to speed dial or any other function used in cellular telephones.

The cellular telephone 10 further includes a power key 18 that turns it on and off. The cellular telephone 10 includes a function key 20. When the user depresses the function key 20, a list of functions appears on the display 12. Arrow keys 22 are then used to sequentially step up and down through the functions appearing on the display 10. The clear key 24 may be used to cancel any mistaken entry, and the recall key 26 may be used to display the last number called to make it easy for the user to re-call a telephone number.

For the cellular telephone 10, the first set of keys 14 and the power key 18 define primary keys, the second set of keys 16, the function key 20, and the recall key 26 define secondary keys, and the arrow keys 22 and the clear key 24 define tertiary keys.

Figure 2:
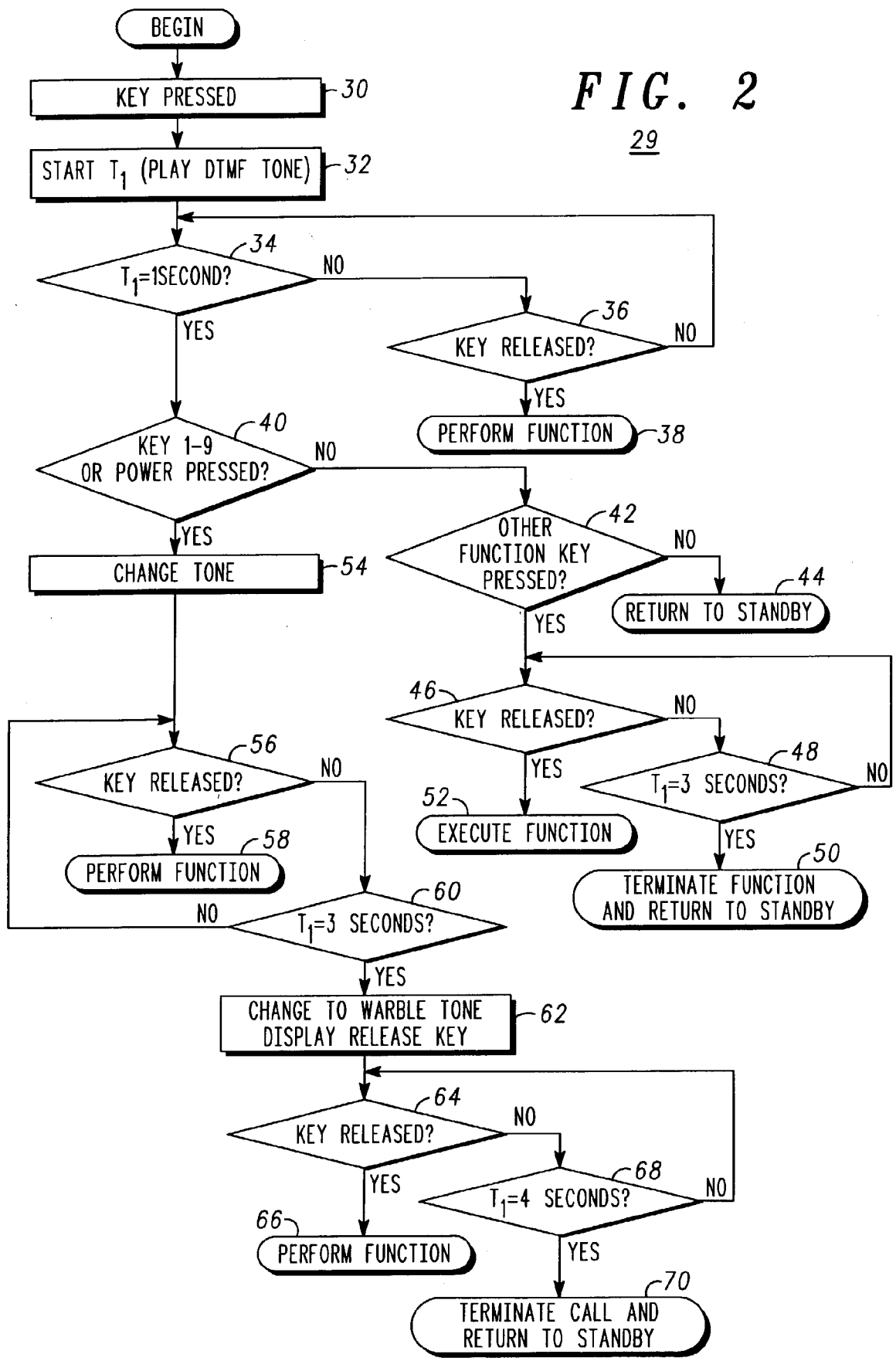
FIG. 2 is a flowchart of a method of protecting against an inadvertent keystroke.

FIG. 2 displays a flowchart which depicts a process 29 that may be implemented in the cellular telephone 10 to ensure that a key, e.g. keys 15, that has been accidentally depressed does not cause a speed dial or any other function to be performed. The cellular telephone 10 may initially be in either the standby mode or the active mode. Upon a key being pressed, 30, a timer is started, 32, start time T1 is noted, and a first tone is sounded. The CPU of the telephone checks, 34, to see if a first predetermined amount of time has passed. In this non-limiting example, the first predetermined amount of time may be one second. Generally within this disclosure, and purely for the sake of brevity, the first predetermined amount of time is one second, but no limitation should be read therein as other amounts of time could easily be selected. Further, disclosures infra of other amounts of time will similarly not be limited. If one second has not passed, the CPU next checks, 36, to determine if the depressed key has been released. If the key has been released, 38, the cellular telephone 10 will proceed with its normal dialing function. If the key has not been released, however, the CPU will then check again, 34 and 36, to see if the first predetermined amount of time has elapsed with the key still depressed.

Once the CPU determines that the first predetermined amount of time has elapsed, the CPU determines which key has been depressed. First, the CPU determines if any of the primary keys—the first set of keys 14 or if the power key 18—was depressed, 40. The primary keys could also include other keys not depicted in this example of the cellular phone 10 such as a mail key, a send key, etc. If none of the primary keys have been depressed, the CPU determines if the key depressed was one of the secondary keys, 42. If neither a primary nor a secondary key has been pressed, a tertiary key has been depressed. If a tertiary key has been pressed, the CPU returns the telephone to standby mode, 44.

If a secondary key was depressed, 42, the CPU next checks if the secondary key has been released, 46. If the secondary key has not been released, the CPU checks if a second predetermined amount of time has elapsed from time T1, 48. In another non-limiting example, the second predetermined amount of time is three seconds, however, any time may be selected. If three seconds have elapsed since time T1 with the key being continuously depressed, 48, the CPU returns the telephone to standby mode, 50. If three seconds have not yet elapsed, 48, the CPU again determines if the depressed key has been released, 46. If the key has been released, the function assigned to the secondary key is performed, 52.

If one of the primary keys has been depressed, 40, the CPU changes the emitted tone, 54, then checks to see if the depressed key has been released, 56. If the key has been released, 56, the function according to that key will be performed, 58. For example, if the power key 18 is depressed, the cellular telephone 10 will turn off. If one of the keys 15 of the first set 14 is depressed, in this example a telephone number is speed dialed according to the number preprogrammed into the cellular phone 10 and associated with that key 15.

If the key 15 is not released, 56, the CPU checks if three seconds have elapsed since time T1, 60. If three seconds have not elapsed, 60, the CPU rechecks if the key 15 has been released, 56. If three seconds have elapsed, 60, a new alert tone is emitted and the display 12 produces a message to release the key 15, 62. The CPU again checks if the key 15 has been released, 64. If the key 15 has been released, the cellular telephone 10 performs the function associated with the key 15, 66. If the key has not been released, the CPU determines if a third predetermined amount of time has elapsed, 68. In another non-limiting example, four seconds will be used as an example of the third predetermined amount of time. If four seconds have not elapsed, the CPU will again check if the key has been released, 64. If four seconds have elapsed, and the key is still depressed, 70, the function is terminated and the cellular telephone 10 is returned to standby mode.

In the exemplary cellular telephone 10, the differences between the primary keys and the secondary keys is in the functions associated therewith, respectively, over the predetermined periods of time. The process 29 uses a first time period, wherein the amount of time a key is depressed is less than one second, a second time period in which the time a key is depressed is between one second and three seconds, a third time period between three and four seconds, and a fourth time period after four seconds. The primary keys have a functionality in the first time period, i.e. dialing a digit in a telephone number, then a different functionality from that of the first time period in the second and third time period, for example performing a speed dial. The secondary keys have the same functionality in the first and second time periods. Of course, it will be appreciated that other arrangements of functionality may be made as well.

Thus, according to process 29, the cellular telephone 10 can determine if a keystroke is inadvertent or purposeful. It saves the user from needlessly wasting power and making unwanted phone calls.

Figure 3:
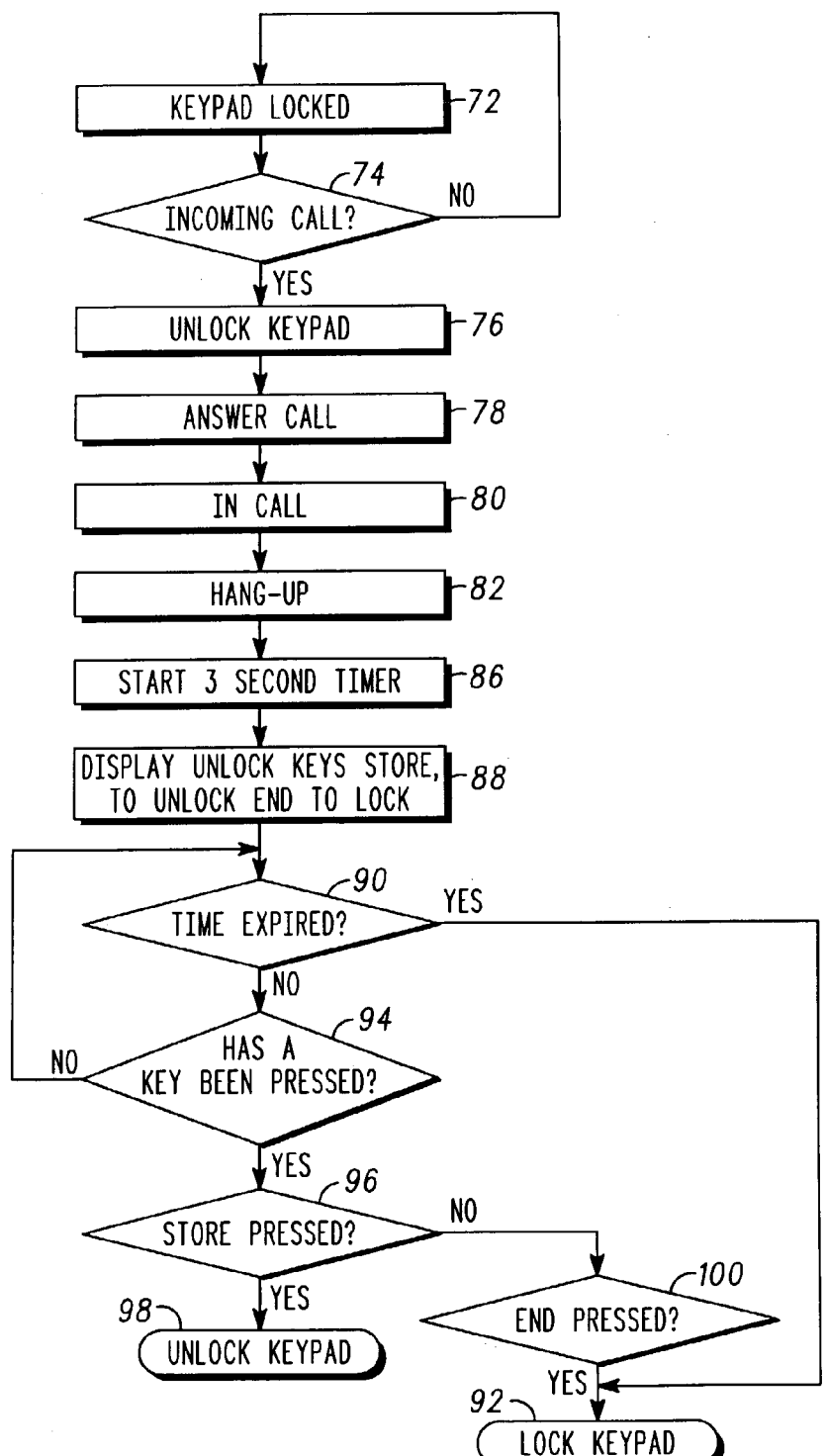
FIG. 3 is a flowchart of an improved method of receiving a telephone call while the cellular telephone keypad is locked.
Figure 4:
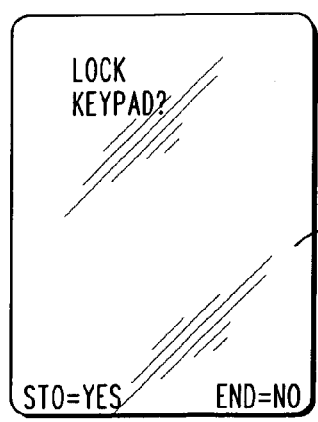
FIG. 4 is an example of a display of a cellular telephone in accordance with the method of FIG. 3.

FIG. 3 illustrates a process 71 that improves the use of the cellular phone 10 in the locked mode. The process 71 begins when the cellular telephone 10 receives a telephone call while in locked mode, i.e., the key pad 13 is locked, 72. In this mode, the keys of the cellular phone 10 are inactive. Once an incoming call is received, 74, the keypad is unlocked, 76, the call is answered, 78, the call is carried out, 80, and the user then terminates the call, 82. After the user terminates the call, 82, a timer is started, 86. In another non-limiting example, the timer is set for three seconds. The display 12 produces an inquiry to the user whether he or she would like to unlock the keys, 88. FIG. 4 depicts a possible inquiry to the user shown on the display 12 of the cellular telephone 10.

The CPU then checks if the timer has expired, 90. If the timer has expired, the keypad is locked again, 92. If the timer has not expired, the CPU checks to see if a selection has been made by the user, 94. If a selection has been made, the CPU determines if the selection was to unlock the keypad, 96, 98, or if the selection was to lock the keypad, 100, 92. If the user selects to unlock the keypad, the cellular telephone 10 is placed in the active mode.

In this manner, the cellular telephone 10 presents the option to the user of unlocking the keypad after conducting a telephone call if the call was received while the telephone was in the locked mode. This is advantageous to the user in that in many instances, after receiving a telephone call, the user needs to make another call. This is an easier method of unlocking the keypad than that used by the prior art.

From the foregoing, one of ordinary skill in the art will appreciate that the present disclosure sets forth a method for protecting against an inadvertent keystroke in a telephone. However, one of ordinary skill in the art could readily apply the novel teachings of this disclosure to any number of apparatuses in which keys are depressed to enter information into a system. This includes, but is not limited to, personal computers, data entry systems, calculators, etc. As such, the teachings of this disclosure shall not be considered to be limited to the specific examples disclosed herein, but to include all applications within the spirit and scope of the invention.

What is claimed is:

1. A method of determining if a keystroke in a system was inadvertent, the system including a set of keys and a display, the system being in either a standby mode or an active mode, the method comprising:
   switching the system to or maintaining the system in an active mode upon a key of the set of keys being pressed;
   initiating a timer that indicates the amount of time the key has been continuously depressed; and
   switching the system to the standby mode if the key has been continuously depressed for a predetermined amount of time; and
   wherein the system further defines a plurality of discrete amounts of time, the method further comprises selecting one of the plurality of discrete amounts of time to be the predetermined amount of time based on which key of the set of keys is depressed.

2. The method of claim 1, wherein the plurality of discrete amounts of time includes a first amount of time and a second amount of time, the set of keys includes a subset of secondary keys, the continuously depressed key being one of the subset of secondary keys.

3. The method of claim 2, further comprising sounding an alert tone after the first amount of time has elapsed with the key being continuously depressed.

4. The method of claim 2, further comprising selecting the second amount of time to be the predetermined amount of time and returning the system to the standby mode after either the second amount of time has elapsed with the key being continuously depressed.

5. The method of claim 1, wherein the plurality of discrete amounts of time includes a first amount of time, a second amount of time, and a third amount of time, the set of keys includes a subset of primary keys, and the continuously depressed key is one of the subset of primary keys.

6. The method of claim 5, further comprising performing a first function if the continuously depressed key is released before the first amount of time has elapsed.

7. The method of claim 6, further comprising perfomiing a second function if the continuously depressed key is released after the first amount of time.

8. The method of claim 5, further comprising selecting the third amount of time to be the predetermined amount of time and returning the system to the standby mode if the continuously depressed key has not been released after the third amount of time has elapsed.

9. A cellular telephone that prevents the inadvertent dialing of a telephone, the telephone comprising:
   a central processing unit;
   a plurality of keys; and
   a timer that indicates the amount of hme a key bus been continuously depressed,
   whereby upon the depressing of one of the plurality of keys, the timer is initiated, the central processing unit switches the telephone to an active mode, and if the key has been continuously depressed for over a predetermined time based on the amount of time indicated by the timer, and wherein the system further defines a plurality of discrete amounts of time and the method further comprises selecting one of the plurality of discrete amounts of time to be the predetermined amount of time based on the which one key of the set of keys is depressed, then the central processing unit switches the phone to a standby mode.

* * * * *